UNITED STATES PATENT OFFICE.

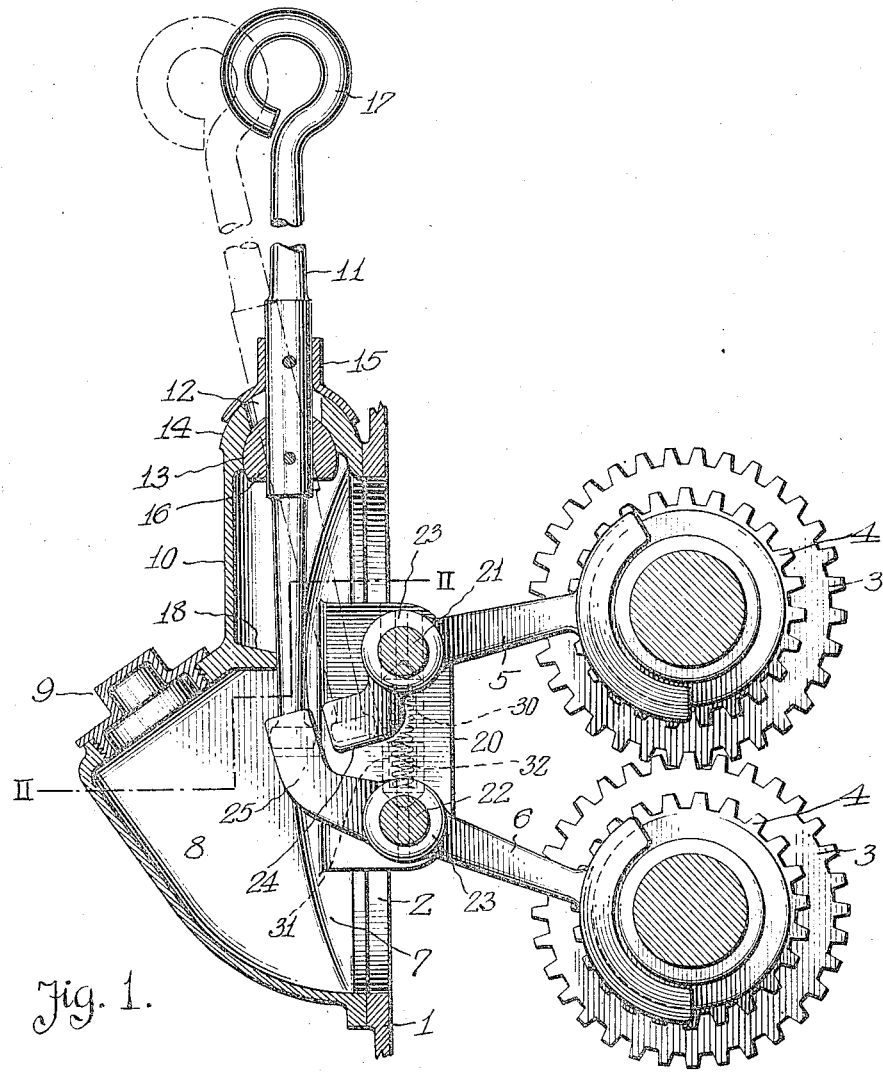

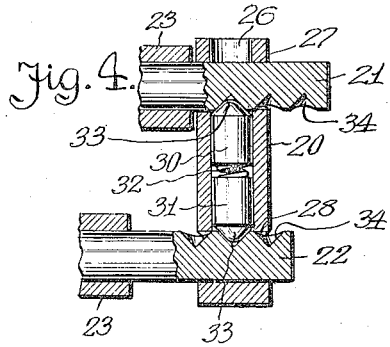
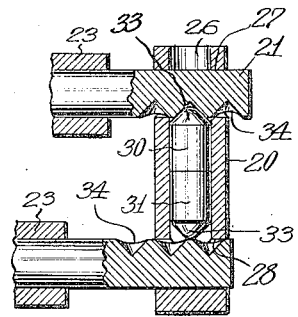
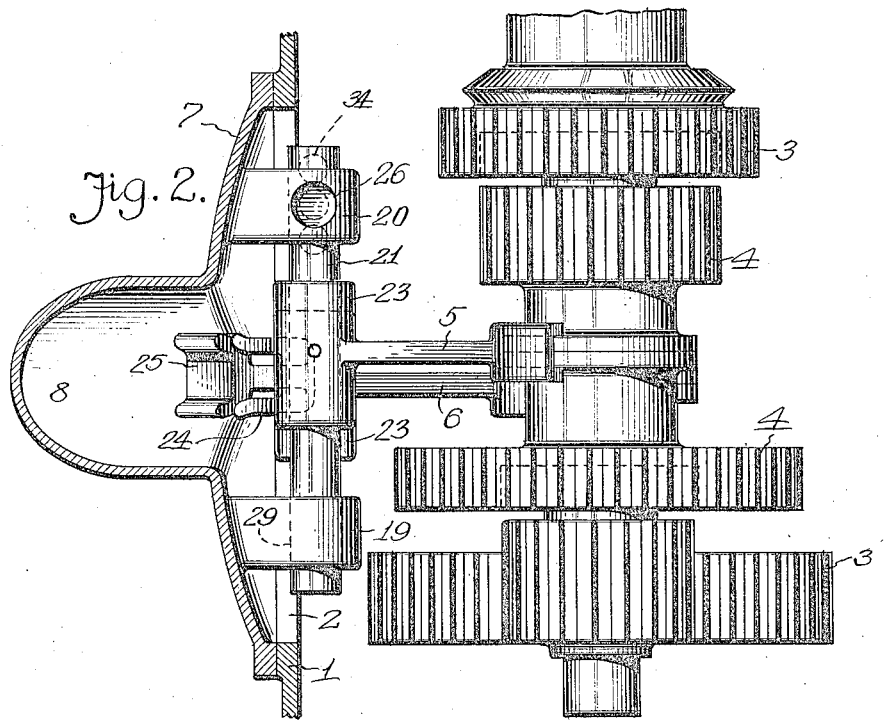
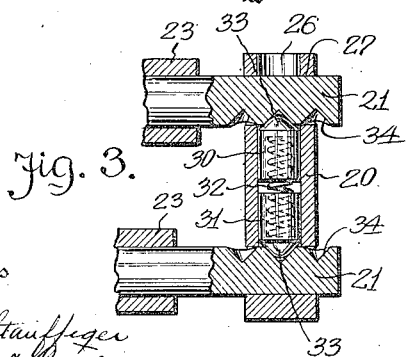

HENRY FORD, OF DEARBORN, MICHIGAN.

GEAR-SHIFT-LOCKING DEVICE.

1,377,331.    Specification of Letters Patent.    Patented May 10, 1921.

Application filed July 10, 1918. Serial No. 244,152.

*To all whom it may concern:*

Be it known that I, HENRY FORD, a citizen of the United States of America, residing at Dearborn, in the county of Wayne and State of Michigan, have invented certain new and useful Improvements in Gear-Shift-Locking Devices, of which the following is a specification, reference being had therein to the accompanying drawings.

In my companion application filed under even date, there is disclosed a transmission mechanism for tractors, and the mechanism is located between the engine and the rear axle of the tractor in order that the tractor may be moved at different speeds and reversed. A gear shift lever is employed to shift certain gears of the transmission mechanism, and this invention has special reference to a novel locking device adapted to prevent accidental movement of the gear shift lever and accidental shifting of the shiftable gears of the transmission mechanism, thereby precluding any clashing of gears or accidental changing from one speed to another, during the operation of the tractor.

The object of the present invention is to provide a positive and reliable locking device that may be readily associated with the reciprocable rods or shafts that generally support the gear shifters of any transmission mechanism having variable speeds accomplished through the medium of shiftable gears, the locking device being automatic in its action and highly efficient for the purposes for which it is intended.

The locking device will be hereinafter considered in detail, and then claimed, and reference will now be had to the drawings, wherein—

Figure 1 is a vertical sectional view of a gear shift plate having a gear shift lever and gear shifters held by a lock in accordance with my invention;

Fig. 2 is a horizontal sectional view of the gear shift plate relative to a portion of the transmission mechanism, showing the shiftable gears of said transmission mechanism in neutral position;

Fig. 3 is a vertical sectional view of the locking device in neutral position;

Fig. 4 is a similar view showing the locking device holding one of the rods or shafts in neutral position and the other in a shifted position, and Fig. 5 is a similar view showing one of the rods or shafts held in neutral position and the other in a position it may assume when shifted.

As illustrating the location of the locking device relative to the transmission mechanism, I have shown a portion of a transmission housing wall 1 having an opening 2 and adjacent said opening are transmission gears, generally denoted 3, and including shiftable gears 4, said gears being shifted through the medium of an upper gear shifter 5 and a lower gear shifter 6.

Suitably connected to the housing wall 1, at the opening 2 thereof, is a convexo-concave gear shift plate 7 having the lower part thereof provided with a lubricant well 8 provided with a detachable filling cap 9. The upper part of the shift plate 7 has a casing 10 for a gear shift lever 11, said casing having the top thereof provided with an opening 12, a socket 13, and a convex face 14. The lever 11 extends through the opening 12 and has a fixed convexo-concave retaining member 15 on the convex face 14 of the casing 10, and fixed on the lever, within the socket 13, is a ball member 16 which coöperates with the retaining member 15 in holding the gear shift member 11 in engagement with the casing 10, yet permitting of the gear shift lever being oscillated or rocked with the ball member 16 as a fulcrum. The outer end of the lever 11 has a suitable handle or hand grip 17 and the inner end of said lever extends past a longitudinal stop and guide flange 18 at the juncture of the casing 10 with the lubricant well 8, said flange serving as a guide when said lever is oscillated in one direction and as a stop to prevent oscillation of the lever in another direction.

The inner face of the plate 7 is provided with vertically disposed parallel bearings 19 and 20 and slidable in said bearings are reciprocable parallel rods or shafts 21 and 22. Pinned or otherwise fixed on the rods or shafts 21 and 22, intermediate the ends thereof, are the hub portions 23 of the upper and lower gear shifters 5 and 6, said hub portions having forked or bifurcated members 24 and 25, and the inner end of the lever 11 may engage in either member, so that either gear shifter may be reciprocated or shifted in a desired direction. As shown in Fig. 1, the lever 11 engages the forked member 25, but may be shifted to the dot and dash position to engage the member 24, The bearing 20 constitutes a stationary support and is provided with a vertical bore 26 intersected by longitudinal openings 27 and 28, said openings alining with similar openings 29 in the bearings 19, so as to receive the ends of the reciprocable rods or shafts 21 and 22. The bore 26 has the upper end thereof open, and the lower end thereof terminating at the opening 28, said bore being open so that the locking device can be installed.

The locking device comprises two confronting cup shaped members 30 and 31 slidable within the bore 26 of the bearing 20, said members having the confronting ends thereof cupped or recessed so as to accommodate the end convolutions of a coiled expansion spring 32. The spring is adapted to maintain the members 30 and 31 normally separated, but permit of said members contacting, when necessary, and the outer ends of said members are provided with noses or rounded heads 33 adapted to engage in sockets or recesses 34 provided therefor in the ends of the reciprocating rods or shafts 21 and 22 which slide in the openings 27 and 28 respectively.

As shown in Fig. 3, the locking members 30 and 31 engage the centralmost sockets 34 of the rods or shafts 21 and 22 respectively, thus holding said shafts in neutral position. As the rod or shaft 21 is reciprocated through the medium of the lever 11, the locking member 30 recedes relative to the locking member 31, and the locking member 31 remains stationary, holding the rod or shaft 22 against accidental movement. The locking member 30 will recede until it abuts the locking member 31$^m$ the locking member 31 serving as an abutment to limit the movement of the locking member 30. As soon as the rod or shaft 21 is shifted, the locking member engages in one of the end sockets 34 and thereby locks the rod or shaft 21 in its shifted position.

As shown in Fig. 5, the rod or shaft 21 is held neutral while the rod or shaft 22 is reciprocated; the locking member 31 being shown as about to ride from one socket 34 into another.

It is apparent from the foregoing that the locking members 30 and 31 may serve their respective rods or shafts at will and consequently the locking device is automatic and may be depended on to hold either rod or shaft in an adjusted position. By having the locking members 30 and 31 confronting each other within the bearing or stationary member 20, one locking member is an abutment for the other and permits of a single spring being employed to actuate either of the locking members. This provides a very simple and compact construction and insures safety, since the locked member cannot recede on account of the other, as clearly shown in Fig. 5. It is therefore impossible to shift both of the shafts at one time, and in consequence of such arrangement it is necessary that the shift lever 11 be completely in engagement with one of the members 24 or 25 before either member can be reciprocated.

It is thought that the utility of the locking device is apparent without further description, and while in the drawing there is illustrated a preferred embodiment of my invention, it is to be understood that the structural elements are susceptible to such variations and modifications as fall within the scope of the appended claims.

What I claim is:—

1. The combination of a gear shift plate having a lubricant well at the lower edge thereof, a casing above the well of said plate, an oscillatory lever extending into said casing, and limited in its movement in one direction by the upper edge of the well of said plate, a gear shifter having an end thereof constantly in the vertical axis of said casing and adapted to receive the lower end of said lever, a gear shifter above the first mentioned gear shifter and having an end adapted to receive the lower end of said lever, and means adapted to lock said gear shifter against longitudinal movement until moved by said lever.

2. The combination set forth in claim 1, wherein bearings and rods at one side of said plate support said gear shifters, and said means is located in one of said bearings.

3. The combination of a gear shift plate, bearings carried thereby, reciprocable rods in said bearings and disposed one above the other, gear shifters carried by said rods, a fulcrum lever supported from said plate and adapted for engagement with either gear shifter to reciprocate either rod, and means in one of said bearings between said rods adapted to normally lock said rods against accidental movement and permit of either rod being shifted by said lever.

4. The combination of a vertical gear shift plate, having a lubricant well at the lower edge thereof, a casing at the upper edge of said plate, an oscillatory lever extending into said casing, bearings carried by said plate, reciprocable rods in said bearings adapted for shifting gears and adapted to be shifted by said lever, and vertically disposed means in one of said bearings between said rods adapted to hold said rods normally stationary and permit of either rod being shifted by said lever.

In testimony whereof I affix my signature in the presence of two witness.

HENRY FORD.

Witnesses:
CHAS. E. SORENSEN,
ERNEST KENZLER.